(12) United States Patent
Kim et al.

(10) Patent No.: US 9,602,638 B2
(45) Date of Patent: Mar. 21, 2017

(54) DISPLAY DEVICE

(71) Applicant: SAMSUNG DISPLAY CO., LTD., Yongin, Gyeonggi-Do (KR)

(72) Inventors: Jeung Soo Kim, Gwangju-si (KR); Kyu Han Bae, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/728,516

(22) Filed: Jun. 2, 2015

(65) Prior Publication Data

US 2016/0227654 A1    Aug. 4, 2016

(30) Foreign Application Priority Data

Feb. 2, 2015    (KR) .................. 10-2015-0015877

(51) Int. Cl.
*G06F 1/16* (2006.01)
*H04M 1/02* (2006.01)
*H04M 1/18* (2006.01)

(52) U.S. Cl.
CPC ............ *H04M 1/0202* (2013.01); *G06F 1/16* (2013.01); *H04M 1/0266* (2013.01); *H04M 1/185* (2013.01)

(58) Field of Classification Search
CPC ........ G06F 1/16; G06F 1/1601–1/1611; G06F 1/1613–1/1698; G06F 1/18–1/189; H05K 5/00–5/069; H05K 7/00–7/186
USPC ............ 361/679.01–679.45, 679.55–679.61, 361/724–727, 679.26–679.3, 361/679.31–679.39; 335/214, 219, 225, 335/228–230, 234, 250, 262, 274, 275, 335/285, 296, 302–306; 455/575.1–575.9; 312/223.1–223.3; 349/56–60; 348/787, 789, 794
See application file for complete search history.

(56) References Cited

U.S. PATENT DOCUMENTS

| | | | | |
|---|---|---|---|---|
| 8,548,539 | B2 * | 10/2013 | Kim ..................... | H01Q 1/38 340/572.1 |
| 2001/0003471 | A1 * | 6/2001 | Lee ..................... | G02F 1/133308 349/58 |
| 2009/0180247 | A1 * | 7/2009 | Park .................... | H05K 5/02 361/679.21 |
| 2009/0237586 | A1 * | 9/2009 | Han .................... | G02F 1/133308 349/58 |
| 2009/0267222 | A1 * | 10/2009 | Zhong ................. | H01L 23/3128 257/707 |

(Continued)

FOREIGN PATENT DOCUMENTS

| | | |
|---|---|---|
| KR | 10-2013-0005661 A | 1/2013 |
| KR | 10-2013-0030720 A | 3/2013 |

(Continued)

*Primary Examiner* — Anthony Haughton
*Assistant Examiner* — Razmeen Gafur
(74) *Attorney, Agent, or Firm* — Lee & Morse, P.C.

(57) ABSTRACT

A display device, including a mold frame including a bottom portion and a plurality of bent portions, the bent portions being bent from sides of the bottom portion in a direction toward a first surface of the bottom to overlap the bottom portion; a display module on a first side of the mold frame; and a bracket on a second side of the mold frame and coupled to the mold frame, the mold frame further including a receiving space, the receiving space being defined by a first surface of the bottom portion and the bent portions for accommodating parts therein.

20 Claims, 12 Drawing Sheets

(56) References Cited

U.S. PATENT DOCUMENTS

| | | | | |
|---|---|---|---|---|
| 2011/0019363 A1* | 1/2011 | Vahlsing | H05K 7/20972 | 361/695 |
| 2011/0050657 A1* | 3/2011 | Yamada | H01L 27/3293 | 345/204 |
| 2011/0116220 A1* | 5/2011 | Lee | G02F 1/133308 | 361/679.02 |
| 2012/0140414 A1* | 6/2012 | Ishikawa | F04F 7/00 | 361/691 |
| 2012/0293960 A1* | 11/2012 | Takashima | G02F 1/133308 | 361/707 |
| 2013/0027857 A1* | 1/2013 | Jeong | G02F 1/133308 | 361/679.01 |
| 2013/0107161 A1* | 5/2013 | Choi | G02F 1/133308 | 349/58 |
| 2013/0135795 A1* | 5/2013 | Shen | G02F 1/133608 | 361/679.01 |
| 2013/0162506 A1* | 6/2013 | Kim | G06F 1/32 | 345/82 |
| 2013/0163204 A1* | 6/2013 | Huang | H01L 51/5237 | 361/704 |
| 2013/0308252 A1* | 11/2013 | Watanabe | H05K 7/20963 | 361/679.01 |
| 2013/0335899 A1* | 12/2013 | Wang | H04M 1/0249 | 361/679.01 |
| 2013/0342975 A1* | 12/2013 | Kim | H05K 5/0017 | 361/679.01 |
| 2014/0009883 A1* | 1/2014 | Fujiwara | G06F 1/20 | 361/679.48 |
| 2014/0016346 A1* | 1/2014 | Hsu | H05K 5/0017 | 362/606 |
| 2014/0063718 A1* | 3/2014 | Yasumoto | B60K 35/00 | 361/679.21 |
| 2014/0168566 A1* | 6/2014 | Cho | G02F 1/133615 | 349/58 |
| 2014/0177147 A1* | 6/2014 | Teramoto | H05K 13/00 | 361/679.01 |
| 2014/0240926 A1* | 8/2014 | Choi | H04M 1/0266 | 361/707 |
| 2014/0362325 A1* | 12/2014 | Lee | G02F 1/133308 | 349/58 |

FOREIGN PATENT DOCUMENTS

| | | |
|---|---|---|
| KR | 10-2013-0099542 A | 9/2013 |
| KR | 10-2014-0031358 A | 3/2014 |

* cited by examiner

DISPLAY DEVICE

CROSS-REFERENCE TO RELATED APPLICATION

Korean Patent Application No. 10-2015-0015877, filed on Feb. 2, 2015, in the Korean Intellectual Property Office, and entitled: "Display Device," is incorporated by reference herein in its entirety.

BACKGROUND

1. Field

Embodiments relate to a display device.

2. Description of the Related Art

A display device may be equipped with a stainless steel plate for supporting a display panel inside the display device. The stainless steel plate may contact, on a front surface thereof, a rear surface of the display panel and may protect the display panel or other parts of the display device from external impact.

A PCB with various electronic parts mounted thereon and a battery may be provided at the rear of the stainless steel plate. For example, the stainless steel plate may also separate the electronic parts and the battery.

A mold or a stainless steel member may be bonded to the rear of the stainless steel plate through partial welding.

SUMMARY

Embodiments may be realized by providing a display device, including a mold frame including a bottom portion and a plurality of bent portions, the bent portions being bent from sides of the bottom portion in a direction toward a first surface of the bottom portion to overlap the bottom portion; a display module on a first side of the mold frame; and a bracket on a second side of the mold frame and coupled to the mold frame, the mold frame further including a receiving space, the receiving space being defined by a first surface of the bottom portion and the bent portions for accommodating parts therein.

The display device may further include a battery in the receiving space.

The battery may be between, and in contact with, the mold frame and the bracket.

The bottom portion may include a reinforcing protrusion, the reinforcing protrusion protruding into the receiving space, and the battery may be on the reinforcing protrusion.

The bottom portion may further include a reinforcing groove, the reinforcing groove being on a side of the bottom portion opposite the reinforcing protrusion and having a depth corresponding to a height of the reinforcing protrusion.

The bottom portion may have a rectangular shape with four sides, and each of the bent portions may be bent from one of the four sides of the bottom portion.

The mold frame may further include a plurality of non-bent portions, each of the non-bent portions being at a corner of the bottom portion and not overlapping the bent portions.

Each of the bent portions may be bent at least twice by hemming.

The mold frame may include one or more of copper or stainless steel.

The bottom portion may include a receiving groove, the receiving groove being on a side of the bottom portion opposite the receiving space.

The display device may further include a heat dissipation layer in the receiving groove.

The display device may further include a cushion layer covering the heat dissipation layer to shield the heat dissipation layer from an outside of the display device, the cushion layer being attached to the mold frame.

The heat dissipation layer may include a graphite material.

Embodiments may be realized by providing a display device, including a mold frame including a bottom portion and a plurality of bent portions, the bent portions being bent from sides of the bottom portion in a direction toward a first surface of the bottom portion to overlap the bottom portion; a display module on a first side of the mold frame; a cushion layer between the mold frame and the display module; a battery; and a bracket on a second side of the mold frame and coupled to the mold frame, the mold frame further including a receiving space, the receiving space being defined by the first surface of the bottom portion and the bent portions for accommodating parts therein, the battery being in the receiving space.

The display device may further include a heat dissipation layer between the mold frame and the cushion layer.

The bottom portion may have a rectangular shape with four sides, and each of the bent portions may be bent from one of the four sides of the bottom portion.

The mold frame further may include a plurality of non-bent portions, each of the non-bent portions being at a corner of the bottom portion and not overlapping the bent portions.

The bottom portion may include a receiving groove, the receiving groove being on a side of the bottom portion opposite the receiving space.

The bottom portion may include a reinforcing protrusion, the reinforcing protrusion protruding into the receiving space, and the battery may be on the reinforcing protrusion.

The bottom portion may further include a reinforcing groove, the reinforcing groove being on a side of the bottom portion opposite the reinforcing protrusion and having a depth corresponding to a height of the reinforcing protrusion.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
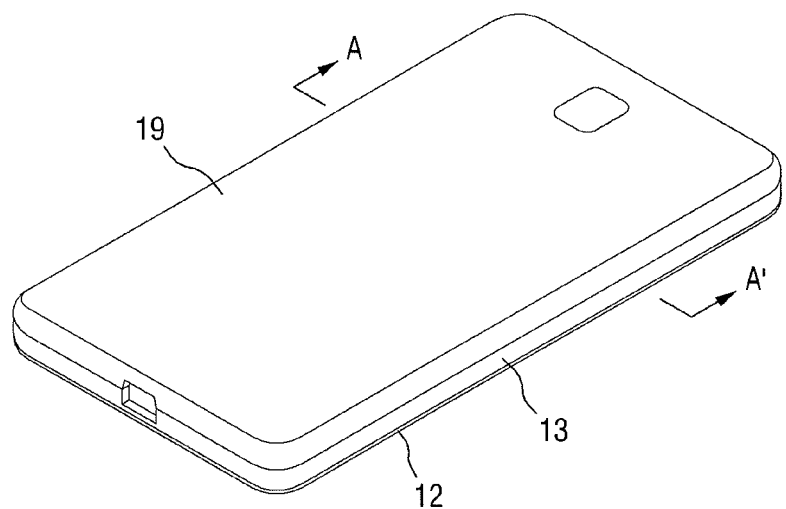
FIG. 1 illustrates a perspective view of a display device according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers and regions may be exaggerated for clarity. As used herein, the term "and/or" includes any and all combinations of one or more of the associated listed items.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises," "comprising," "includes," and/or "including," when used in this specification, specify the presence of stated features, integers, operations, elements, and/or components, but do not preclude the presence or addition of one or more other features, integers, steps, operations, elements, components, and/or groups thereof.

Exemplary embodiments will hereinafter be described with reference to the accompanying drawings.

Figure 2:
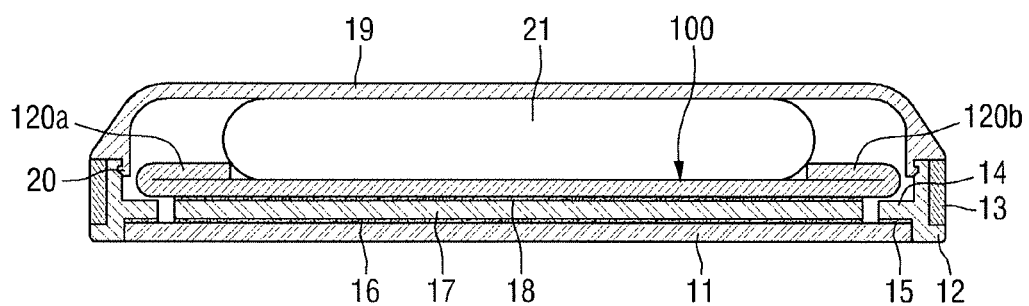
FIG. 2 illustrates a cross-sectional view of the display device according to a first exemplary embodiment, taken along line A-A' of FIG. 1.
Figure 3:
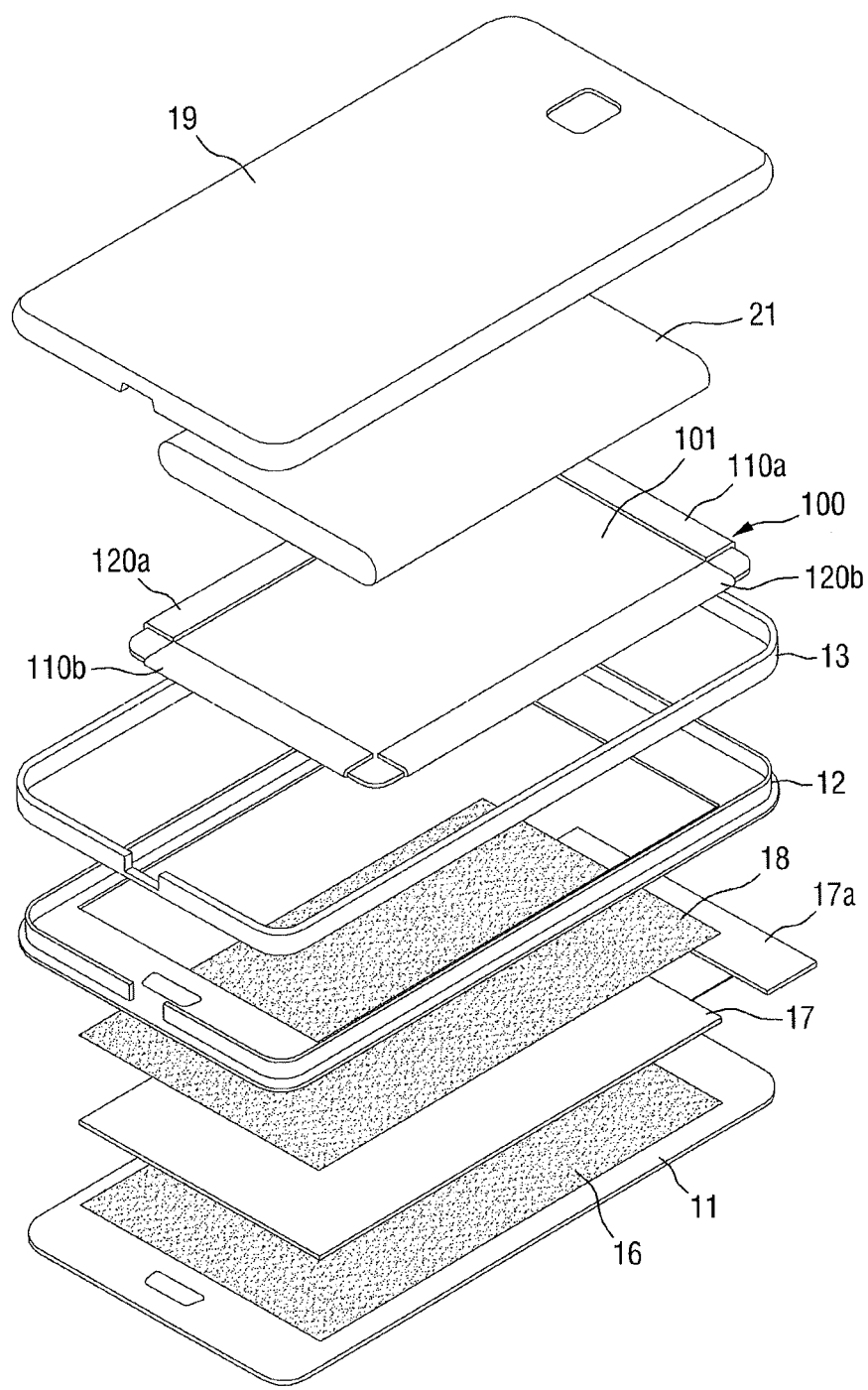
FIG. 3 illustrates an exploded perspective view of the display device according to a first exemplary embodiment.
Figure 4:
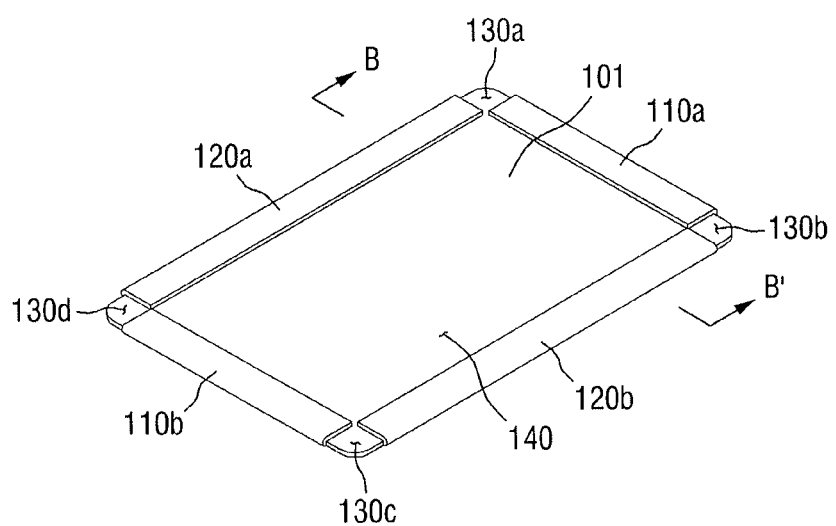
FIG. 4 illustrates a perspective view of a mold frame that is applied to the display device according to a first exemplary embodiment.
Figure 5:
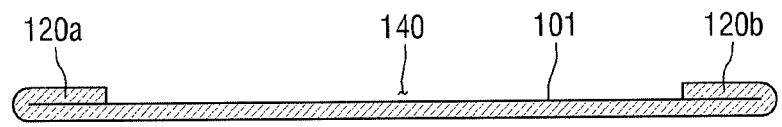
FIG. 5 illustrates a cross-sectional view taken along line B-B' of FIG. 4.

FIG. 1 illustrates a perspective view of a display device according to an exemplary embodiment, FIG. 2 illustrates a cross-sectional view of the display device according to the exemplary embodiment of FIG. 1 taken along line A-A' of FIG. 1, FIG. 3 illustrates an exploded perspective view of the display device according to the exemplary embodiment of FIG. 1, FIG. 4 illustrates a perspective view of a mold frame that is applied to the display device according to the exemplary embodiment of FIG. 1, and FIG. illustrates a cross-sectional view taken along line B-B' of FIG. 4.

Referring to FIGS. 1 to 5, the display device according to a first exemplary embodiment may include a mold frame 100, a display module 17, which may be disposed on one side of the mold frame 100, and a bracket 19, which may be disposed on the other side of the mold frame 100 and may be coupled to the mold frame 100. The display device according to a first exemplary embodiment may also include a front cover 12, which may cover the edges of the display module 17 and a window glass 11, a front deco 13, e.g., a decorative finish, which may surround the outer circumferential surface of the front cover 12, and a battery 21, which may be received on a bottom surface of the mold frame 100.

The window glass 11 may be disposed at the front of the display module 17. The window glass 11 may be formed of a transparent glass material, and may allow an image generated by the display module 17 to be seen therethrough.

The window glass 11 may be disposed on the front cover 12. The front cover 12 may be formed in the shape of a rectangular frame with an open window at the center thereof. The front cover 12 may include a projecting portion 14, which may be formed on the inside of the front cover 12 to protrude inwardly. The projecting portion 14 may protrude inwardly from the middle of the inner sidewall of the front cover 12.

The window glass 11 may be disposed on the projecting portion 14 of the front cover 12. The window glass 11 may be supported along the four sides thereof by as much as the width of the projecting portion 14 protruding inwardly. An adhesive tape 15 may be interposed between the projecting portion 14 and the window glass 11, and may bond the projecting portion 14 and the window glass 11 together.

A height from the projecting portion 14 to one end (for example, the top) of the sides of the front cover 12, may be substantially the same as the thickness of the window glass 11, the end of the sides of the front cover 12 and the surface of the window glass 11 may be disposed on a level with each other, and the surface of a display device may realize a smooth appearance with no height difference. The other end of the sides of the front cover 12 may be placed in contact with, and coupled to, the bracket 19.

The display module 17, the mold frame 100, and the battery 21 may be received in the open window of the front cover 12. In an exemplary embodiment, a plurality of coupling grooves may be formed on the inside of the front cover 12 to face the outside of the front cover 12. In this exemplary embodiment, a plurality of hooks 20, which may be formed on the inside of the bracket 19, may be engaged with, and fixed to, the coupling grooves, respectively, of the front cover 12, and the front cover 12 and the bracket 19 may be coupled together. In an exemplary embodiment, the front cover 12 and the bracket 19 may be coupled to each other by various coupling means other than the hooks 20 and the coupling grooves.

The bracket 19 may be coupled to the front cover 12 to form space in which to mount various parts and may shield the parts mouthed therein from the outside thereof.

The front deco 13 may be formed with the inside penetrated in a thickness direction thereof and may be disposed to surround the outer circumference of the front cover 12, and the front deco 13 may provide a finish to the appearance of a display device and fill the gap between the front cover 12 and the bracket 19.

The display module 17 may be disposed inside the open window of the front cover 12. The display module 17 may be disposed at the same height as the projecting portion 14 of the front cover 12. In an embodiment, the display module 17 may be isolated from the projecting portion 14, as illustrated. In an embodiment, the display module 17 may be disposed to contact the projecting portion 14.

The display module 17 may be disposed to be firmly attached to the window glass 11. A transparent adhesive layer 16 may be provided on the contact surface between the display module 17 and the window glass 11. The transparent adhesive layer 16 may be, for example, an optically clear adhesive (OCA) or an optically clear resin (OCR).

The display module 17 may include a printed circuit board (PCB) 17a on which a display panel and circuits for applying a driving signal to the display panel may be mounted. The display panel may include first and second substrates, which may face each other. An organic light-emitting display panel may be used as the display panel, and an organic light-emitting layer may be interposed between the first and second substrates. In an embodiment, a liquid crystal display (LCD) panel may be used as the display panel, and a liquid crystal layer may be interposed between the first and second substrates.

The display panel may include a display area and a non-display area. The display area, which may be a region where an image may be displayed, may include a plurality of pixels. The pixels may be arranged in a matrix. The non-display area may be disposed to surround the display area. The non-display area may form a bezel portion of the display panel.

The first substrate may be larger than the second substrate and may include a portion not overlapped by the second substrate but protruded from the sides of the second substrate. The non-overlapped portion of the first substrate may correspond to the non-display area, and the PCB 17a may be attached onto the non-overlapped portion of the first substrate.

Driving chips such as a timing controller, a data driving integrated circuit (IC), which may convert image data transmitted thereto from the timing controller into an image data signal and may transmit the image data signal to data lines of the display panel, and a gate driving IC, which may transmit a scan signal to gate lines of the display panel according to a gate control signal transmitted thereto from the timing controller, may be mounted on the PCB 17a. The PCB 17a may be implemented may be attached onto the non-overlapped portion of the first substrate via a connecting member such as a flexible printed circuit board (FPC) or a tape carrier package (TCP).

In an embodiment, some of the driving chips may be directly employed onto the display panel or a PCB. In an embodiment, various other techniques for mounting and connecting driving chips may be used.

The mold frame 100 may be disposed at the bottom of the display module 17. The expression "the bottom of the display module 17", as used herein, may indicate the opposite side of the light-emitting surface of the display module 17. The mold frame 100, unlike the front cover 12, may be formed in the shape of a plate with no opening in the middle.

The display module 17 may be attached to the mold frame 100, and an adhesive layer 18 may be interposed between the mold frame 100 and the display module 17. The adhesive layer 18 may include an adhesive material such as an acrylic adhesive. In an exemplary embodiment, the adhesive layer 18 may include a black ink or a pigment with an opaque color. In this exemplary embodiment, the adhesive layer 18 may prevent color mixing that may be caused in response to, e.g., by, unnecessary light from outside a display device infiltrating into the display module 17.

The mold frame 100 may include a bottom portion 101 and a plurality of bent portions 110a, 110b, 120a and 120b, which may be bent from the sides of the bottom portion 101 toward a second surface of the bottom portion 101 to overlap the bottom portion 101. The bent portion 110a may be bent in an opposite direction to a direction in which the display module 17 is disposed.

The bottom portion 101 may be formed in the shape of a quadrangle with four sides, for example, a rectangle. The bent portions 110a, 110b, 120a and 120b may be bent from the four sides, respectively, of the bottom portion 101. In an embodiment, the bottom portion 101 and the bent portions 110a, 110b, 120a and 120b may be defined by bending over the four sides of a substantially rectangular plate toward the center of the rectangular plate, for example, through hemming. Hemming is a process of bending and folding the edge of a plate onto the plate.

The bent portions 110a, 110b, 120a and 120b may overlap the bottom portion 101, and the mold frame 100 may be thicker in areas where the bent portions 110a, 110b, 120a and 120b are formed than in other areas. Accordingly, the strength in the thickness direction of the mold frame 100 may be improved, and the support for the display module 17 and various other parts mounted at the bottom of the mold frame 100 may also be improved.

Referring to FIG. 4, the four bent portions 110a, 110b, 120a and 120b may be formed along the four sides, respectively, of the bottom portion 101, and four non-bent portions 130a, 130b, 130c and 130d may be defined at the four corners, respectively, of the bottom portion 101. The non-bent portions 130a, 130b, 130c and 130d may be parts along the edges of the bottom portion 101 that do not overlap the bent portions 110a, 110b, 120a and 120b. The non-bent portions 130a, 130b, 130c and 130d may prevent the bent portions 110a, 110b, 120a and 120b from interfering with one another while being folded over to overlap the bottom portion 101. The bent portions 110a, 110b, 120a and 120b may or may not contact one another depending on the width of the bent portions 110a, 110b, 120a and 120b and the area of the non-bent portions 130a, 130b, 130c and 130d. In the exemplary embodiment of FIGS. 1 to 5, the bent portions 110a, 110b, 120a and 120b may be close to, but not in contact with, one another.

The bent portions 110a, 110b, 120a and 120b may be bent inwardly, and an empty space may be defined between the bottom portion 101 and the ends of the bent portions 110a, 110b, 120a and 120b. The volume of the empty space may be determined by the area of part of the bottom portion 101 not overlapped by the bent portions 110a, 110b, 120a and 120b and the height of the bent portions 110a, 110b, 120a and 120b. The empty space may be used as a receiving space 140 for accommodating various parts therein.

Parts necessary for the use of a display device, for example, the battery 21, the PCB 17a, an antenna, and a camera driving module, may be received in the receiving space 140. In the exemplary embodiment of FIGS. 1 to 5, the battery 21 may be received in the receiving space 140.

The battery 21 may be disposed such that a surface of the battery 21 may be received on the bottom portion 101, which may define the receiving space 140, and that four sides of the battery 21 may be placed in contact with the four bent portions 110a, 110b, 120a and 120b, respectively, of the mold frame 100. Accordingly, the battery 21 may be stably received in the mold frame 100. The battery 21 may be fixed and supported by the ends of the bent portions 110a, 110b, 120a and 120b in four directions in a plan view.

The mold frame 100 may also include one or more partitioning members, which may partition the receiving space 140 to receive a plurality of parts therein. For example, in an embodiment, the partitioning members may include sidewalls, which may be disposed on the bottom portion 101 to extend across the bottom portion 101.

The battery 21 may be disposed between the mold frame 100 and the bracket 19 and at the same time, may be directly attached to the mold frame 100 and the bracket 19 via adhesive layers interposed between the battery 21 and the mold frame 100, or between the battery 21 and the bracket 19. For example, the battery 21 may be applied to a sealed battery structure with a non-user-replaceable battery.

In an exemplary embodiment, the mold frame 100 may be formed of a metal such as copper, aluminum, or stainless steel. If the mold frame 100 is formed using a film including a metal such as copper, aluminum, or stainless steel, the flexibility of the mold frame 100 may be maintained, and at the same time, the thinness of a display device may be realized.

In an exemplary embodiment, the mold frame 100 may be formed of an elastic material. In this exemplary embodiment, the mold frame 100 may also absorb external impact.

In the display device according to a first exemplary embodiment, the mold frame 100 may include the bent portions 110a, 110b, 120a and 120b, and the empty space formed by the bent portions 110a, 110b, 120a and 120b may be used as the receiving space 140. Accordingly, the supporting strength of a display device in a thickness direction may be improved, and at the same time, the thinness of a display device may be realized through an efficient use of space.

Other exemplary embodiments will hereinafter be described.

Figure 6:
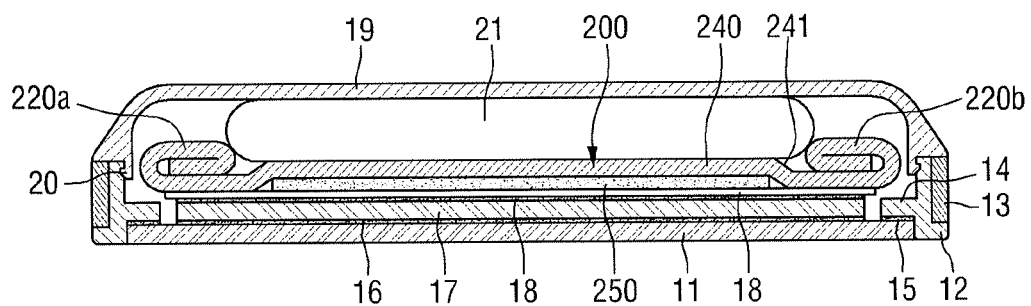
FIG. 6 illustrates a cross-sectional view of a display device according to a second exemplary embodiment, taken along line A-A' of FIG. 1.
Figure 7:
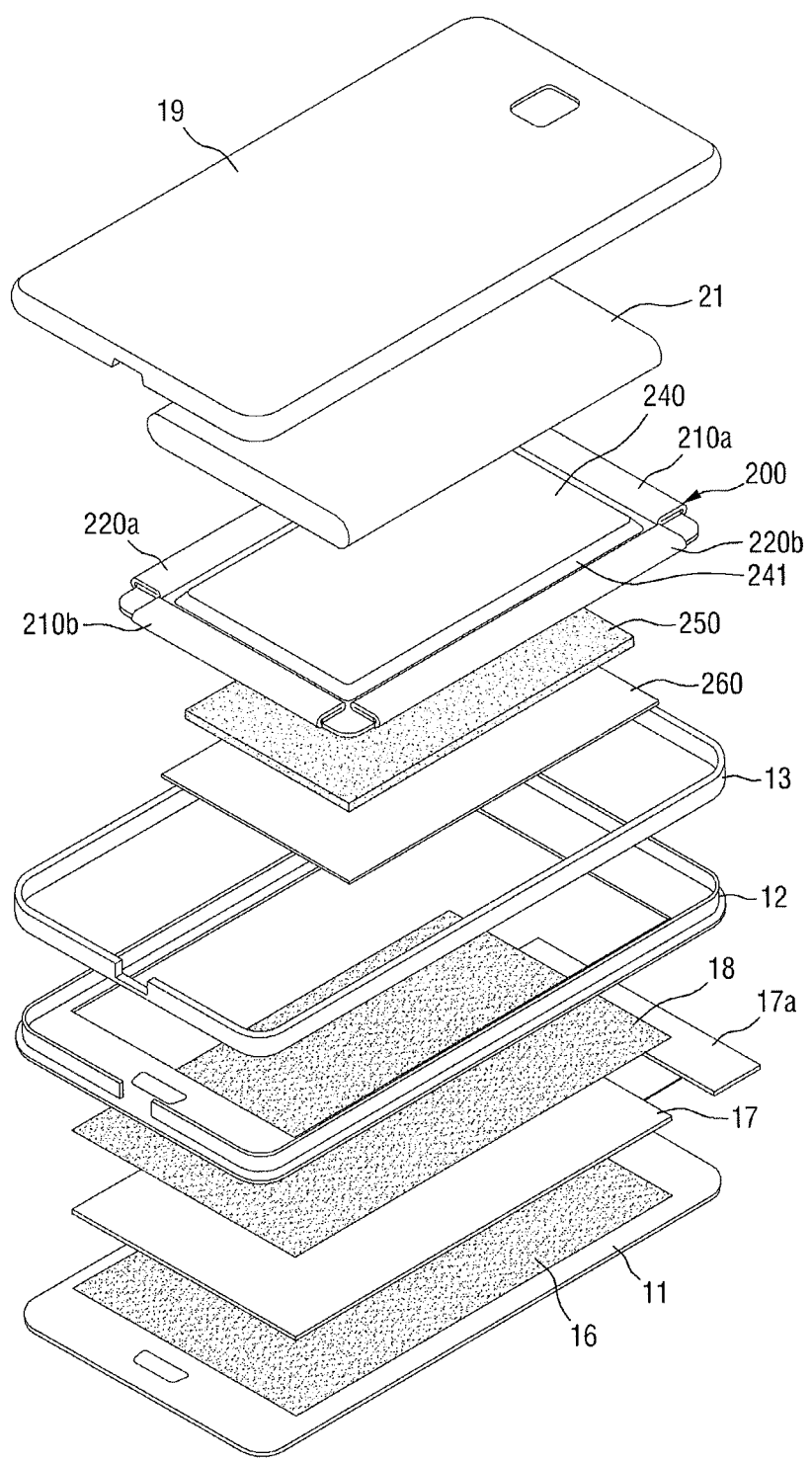
FIG. 7 illustrates an exploded perspective view of the display device according to a second exemplary embodiment.
Figure 8:
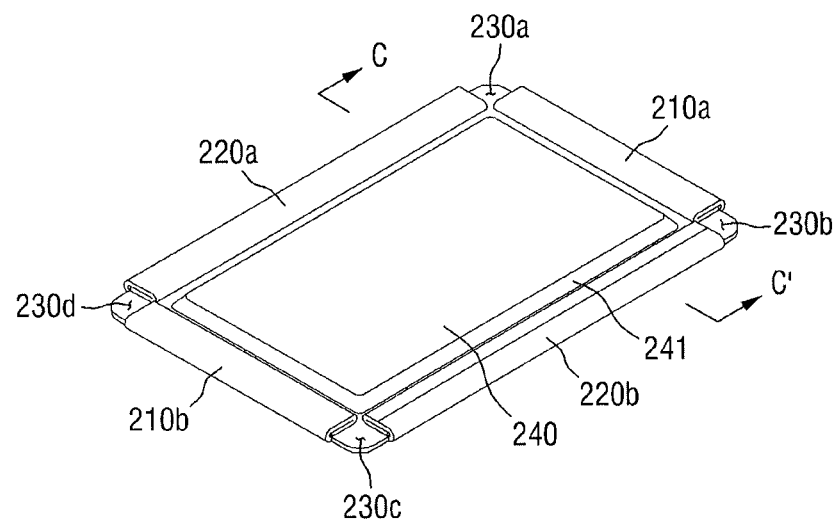
FIG. 8 illustrates a perspective view of a mold frame that is applied to the display device according to a second exemplary embodiment.
Figure 9:
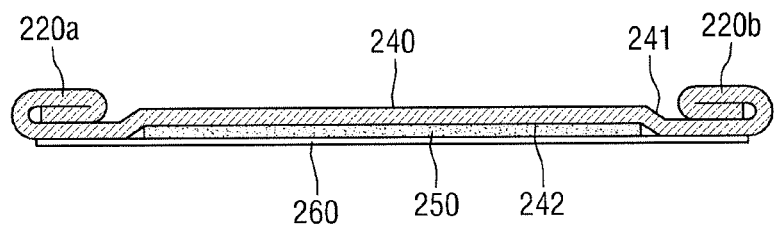
FIG. 9 illustrates a cross-sectional view taken along line C-C' of FIG. 8.

FIG. 6 illustrates a cross-sectional view of a display device according to a second exemplary embodiment, taken along line A-A' of FIG. 1, FIG. 7 illustrates an exploded perspective view of the display device according to a second exemplary embodiment, FIG. 8 illustrates a perspective view of a mold frame that is applied to the display device according to a second exemplary embodiment, and FIG. 9 illustrates a cross-sectional view taken along line C-C' of FIG. 8.

Referring to FIGS. 6 to 9 and further to FIG. 1, the display device according to a second exemplary embodiment may include a display module 17, a window glass 11, which may be disposed at the front of the display module 17, a mold frame 200, which may be disposed at the bottom of the display module 17, a front cover 12, which may surround the edges of the display module 17 and the window glass 11, a front deco 13, which may surround the outer circumferential surface of the front cover 12, battery 21, which may be received on a bottom surface of the mold frame 100, and a bracket 19, which may be disposed on one side of the mold frame 200 and may be coupled to the mold frame 200. The mold frame 200 may include a bottom portion 240 and a plurality of bent portions 210a, 210b, 220a and 220b, which may be bent from the sides of the bottom portion 240 toward a first surface of the bottom portion 240 to overlap the bottom portion 240, and also may include a receiving space, which may be defined by the first surface of the bottom portion 240 and the bent portions 210a, 210b, 220a and 220b for accommodating various parts therein.

The display device according to a second exemplary embodiment may have the same structure as the display device according to a first exemplary embodiment, except for the shape of the mold frame 200, and will hereinafter be described, focusing mainly on differences with the display device according to a first exemplary embodiment.

The mold frame 200 of the second display device according to a second exemplary embodiment may include a cushion layer 260, which may be attached onto an adhesive layer 18 that may be attached on the opposite side of the light-emitting surface of the display module 17. The cushion layer 260 may include a polymer material such as polyurethane (PU), which may absorb impact.

The mold frame 200 may be attached onto, e.g., attached to, the cushion layer 260. The bottom portion 240 may be formed to protrude to have inclined surfaces 240 on one side thereof and have a receiving groove 242 on the other side thereof, and a heat dissipation layer 250 may be embedded on the surface of the mold frame 200 that is attached onto the cushion layer 260. The receiving groove 242 may be formed as being recessed in a direction away from the cushion layer 260 to such a depth that the heat dissipation layer 250 may be completely sealed therein.

The heat dissipation layer 250 may uniformly distribute heat generated by the battery 21 or the display module 17 throughout the area thereof, and may prevent the heat from being concentrated locally. The heat dissipation layer 250 may include a material with excellent thermal conductivity, for example, graphite.

The receiving groove 242 may be provided at the mold frame 200, and the mold frame 200 may exhibit excellent strength, compared to a related-art flat mold frame. The heat dissipation layer 250 may be embedded in the receiving groove 242, and the mold frame 200 may provide excellent heat dissipation capability.

The mold frame 200, like the mold frame 100 of the display device according to a first exemplary embodiment, may include one of copper and stainless steel, and may be attached on the opposite side of the light-emitting surface of the display module 17.

The mold frame 200 may be formed in the shape of a plate and may be transformed by bending the four sides thereof inwardly toward the bottom portion 240 through hemming to overlap the bottom portion 240. The bottom portion 240 of the mold frame 200 may protrude toward the battery 21, and a sufficient height may need to be secured for the four bent portions 210a, 210b, 220a and 220b on the four sides, respectively, of the mold frame 200 to support the four edges of the battery 21 with the battery 21 received on the bottom portion 240. Accordingly, at least two hemming processes may be performed, and a hemming double-barrier structure may be formed.

In the display device according to a second exemplary embodiment, like in the display device according to a first exemplary embodiment, the battery 21 may be disposed in the receiving space formed by the four bent portions 210a, 210b, 220a and 220b and the bottom portion 240. The battery 21 may be disposed in the receiving space with that four sides thereof placed in contact with the four bent portions 210a, 210b, 220a and 220b, respectively, of the mold frame 200, and the battery 21 may be stably received in the mold frame 200. The battery 21 may be fixed and supported by the ends of the bent portions 210a, 210b, 120a and 220b in four directions in a plan view.

Referring to FIG. 8, the four bent portions 210a, 210b, 220a and 220b may be formed along the four sides, respectively, of the bottom portion 240, and four non-bent portions 230a, 230b, 230c and 230d may be defined at the four corners, respectively, of the bottom portion 240. For example, the area of the non-bent portions 230a, 230b, 230c and 230d may be varied as long as the non-bent portions 230a, 230b, 230c and 230d may prevent the bent portions 210a, 210b, 220a and 220b from interfering with one another while being folded over to overlap the bottom portion 240.

Figure 10:
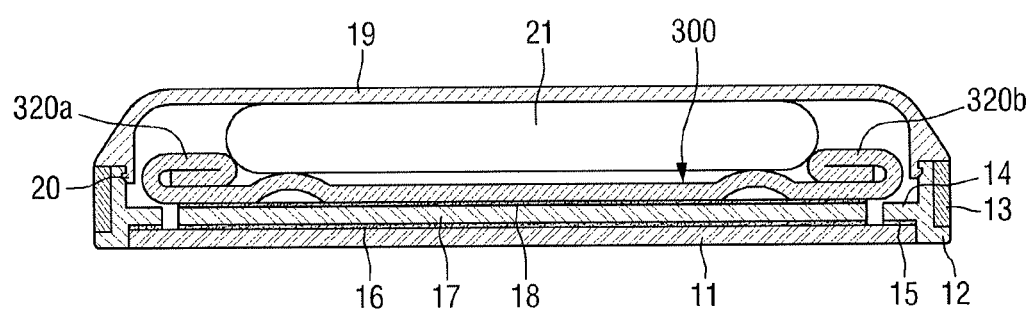
FIG. 10 illustrates a cross-sectional view of a display device according to a third exemplary embodiment, taken along line A-A' of FIG. 1.
Figure 11:
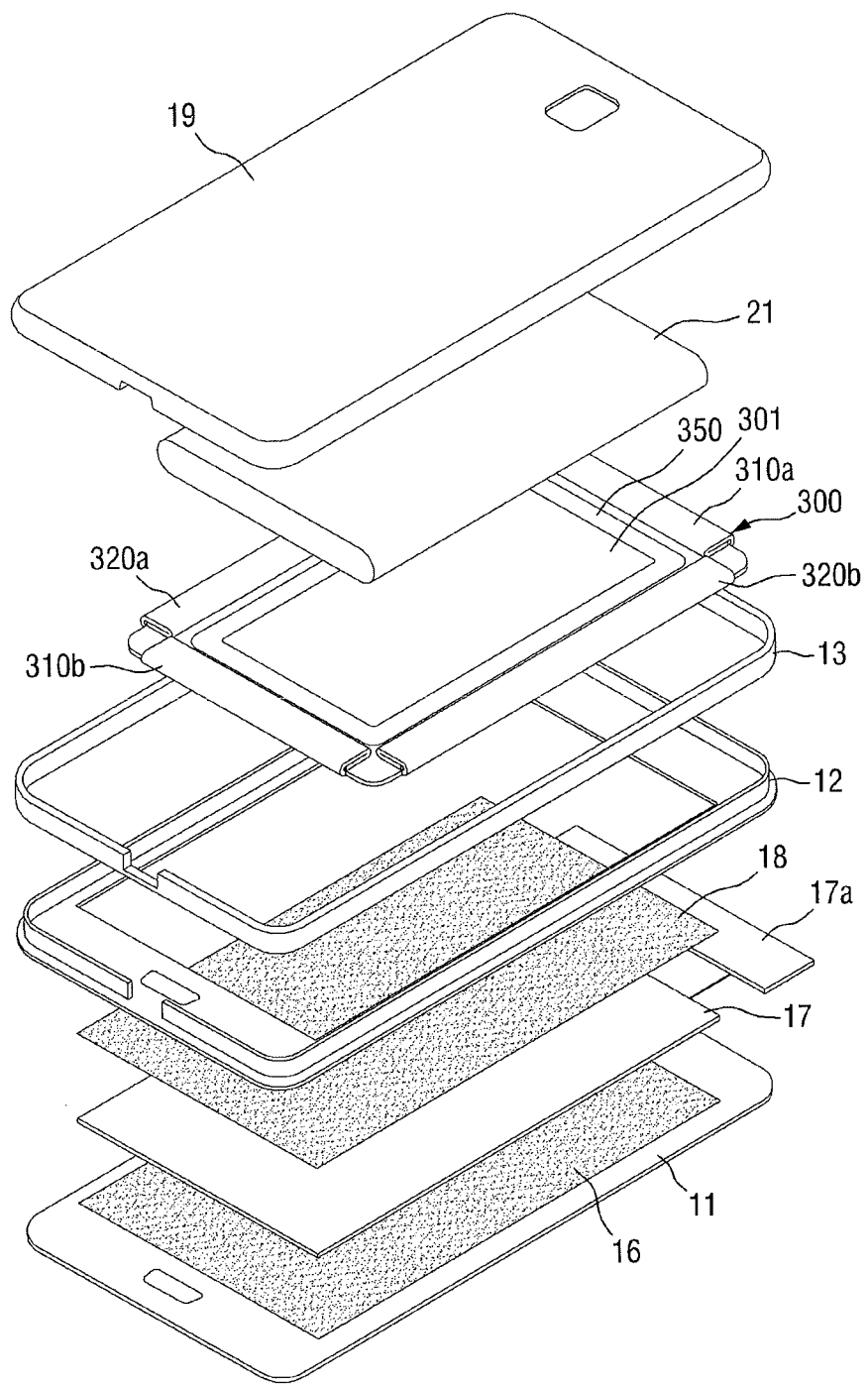
FIG. 11 illustrates an exploded perspective view of the display device according to a third exemplary embodiment.
Figure 12:
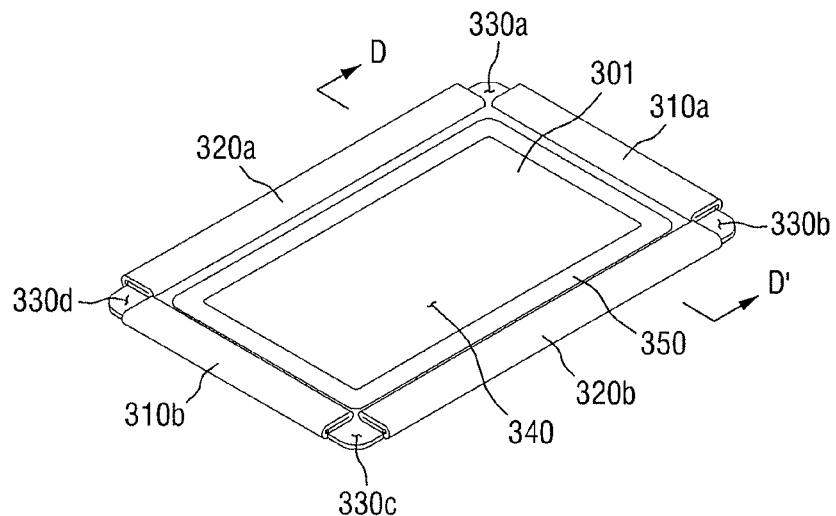
FIG. 12 illustrates a perspective view of a mold frame that is applied to the display device according to a third exemplary embodiment.
Figure 13:
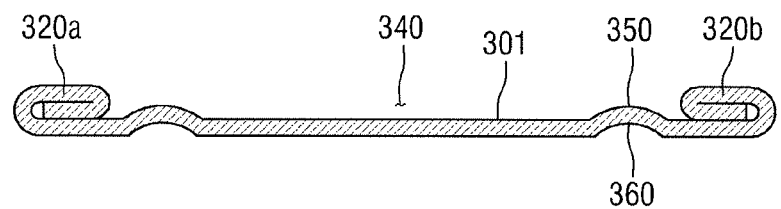
FIG. 13 illustrates a cross-sectional view taken along line D-D' of FIG. 12.

FIG. 10 illustrates a cross-sectional view of a display device according to a third exemplary embodiment, taken along line A-A' of FIG. 1, FIG. 11 illustrates an exploded perspective view of the display device according to a third exemplary embodiment, FIG. 12 illustrates a perspective view of a mold frame that is applied to the display device according to a third exemplary embodiment, and FIG. 13 illustrates a cross-sectional view taken along line D-D' of FIG. 12.

The display device according to a third exemplary embodiment may have the same structure as the display device according to a first exemplary embodiment, except for the shape of a mold frame 300, and will hereinafter be described, focusing mainly on differences with the display device according to a first exemplary embodiment.

Referring to FIGS. 10 to 13, the mold frame 300, which may be applied to the display device according to a third exemplary embodiment, may be attached to a display module 17 via an adhesive layer 18, which may be attached onto the opposite side of the light-emitting surface of the display module 17. The mold frame 300 may include a bottom portion 301 and a reinforcing protrusion 350, which may protrude from the bottom portion 301 in a direction of a normal line to the bottom portion 301, i.e., in a direction toward a battery 21. The reinforcing protrusion 350 may protrude from the bottom portion 301 along and, in parallel with, the edges of the bottom portion 301 to form a rectangular shape in a plan view. The reinforcing protrusion 350 may protrude to have an arch-shaped cross section with an empty space therebelow. For example, the reinforcing protrusion 350 may be formed on a surface of the mold frame 300 to surround the bottom portion 301, and a reinforcing groove 360 may be formed on the other surface of the mold frame 300 to be recessed in an arch shape to a depth corresponding to the height of the reinforcing protrusion 350. Accordingly, the contact area of the mold frame 300 and parts accommodated in the mold frame 300 may be minimized, and the load from the parts and panels deposited on the mold frame 300 may be distributed, and at the same time, the parts and the panels may be stably supported.

The reinforcing protrusion 350 and the reinforcing groove 360 are illustrated in FIGS. 10 to 15 as forming a rectangular shape in a plan view. In an embodiment, a plurality of reinforcing protrusions 350 and a plurality, e.g., more than four, of reinforcing grooves 360 may be formed and arranged on the bottom portion 301 in a matrix, and the strength of the mold frame 300 may be further improved.

The mold frame 300, like the mold frame 100 of the display device according to a first exemplary embodiment, may include one of copper and stainless steel, and may be attached on the opposite side of the light-emitting surface of the display module 17.

The mold frame 300 may be formed in the shape of a plate and may be transformed by bending the four sides thereof inwardly toward the bottom portion 301 through hemming to overlap the bottom portion 301. The reinforcing protrusion 350 may protrude from the bottom portion 301 of the mold frame 300 toward the battery 21, and a sufficient height may need to be secured for the four bent portions 310a, 310b, 320a and 320b on the four sides, respectively, of the mold frame 300 to support the four edges of the battery 21 with the battery 21 received on the bottom portion 301. Accordingly, at least two hemming processes may be performed, and a hemming double-barrier structure may be formed.

Referring to FIG. 12, the four bent portions 310a, 310b, 320a and 320b may be formed along the four sides, respectively, of the bottom portion 301, and four non-bent portions 330a, 330b, 330c and 330d may be defined at the four corners, respectively, of the bottom portion 301. For example, the area of the non-bent portions 330a, 330b, 330c and 330d may be set as long as the non-bent portions 330a, 330b, 330c and 330d may prevent the bent portions 310a, 310b, 320a and 320b from interfering with one another while being folded over to overlap the bottom portion 301.

Figure 14:
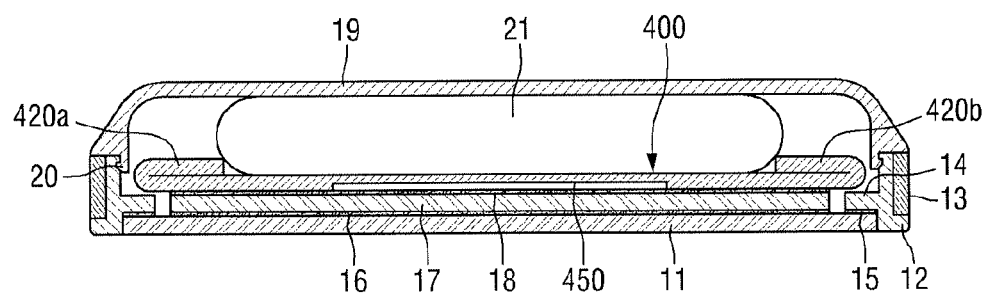
FIG. 14 illustrates a cross-sectional view of a display device according to a fourth exemplary embodiment, taken along line A-A' of FIG. 1.
Figure 15:
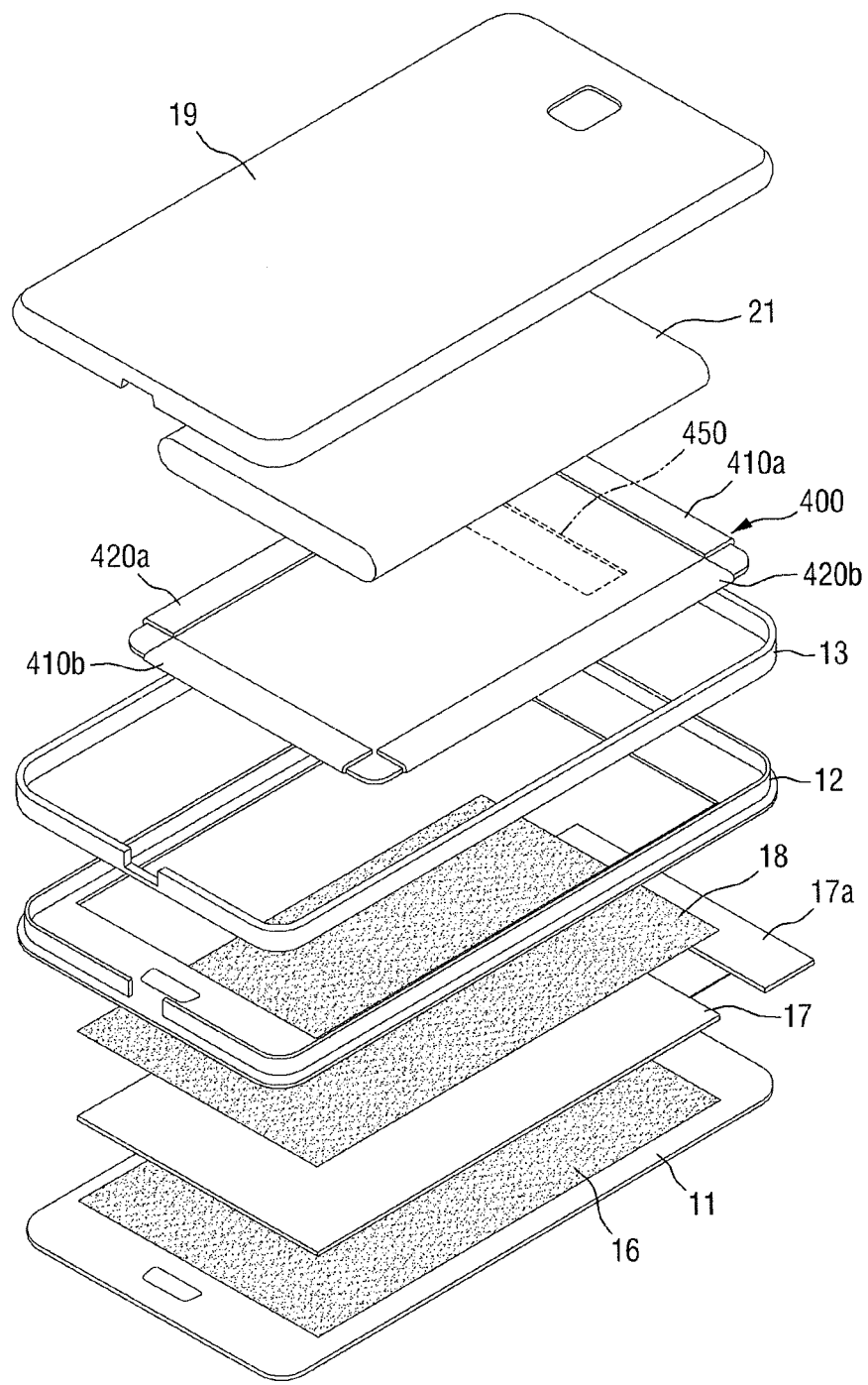
FIG. 15 illustrates an exploded perspective view of the display device according to a fourth exemplary embodiment.
Figure 16:
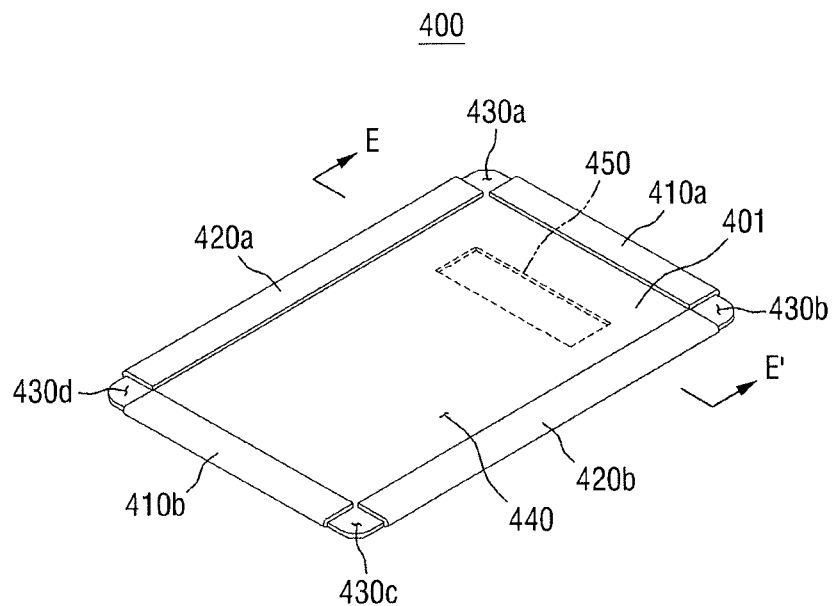
FIG. 16 illustrates a perspective view of a mold frame that is applied to the display device according to a fourth exemplary embodiment.
Figure 17:
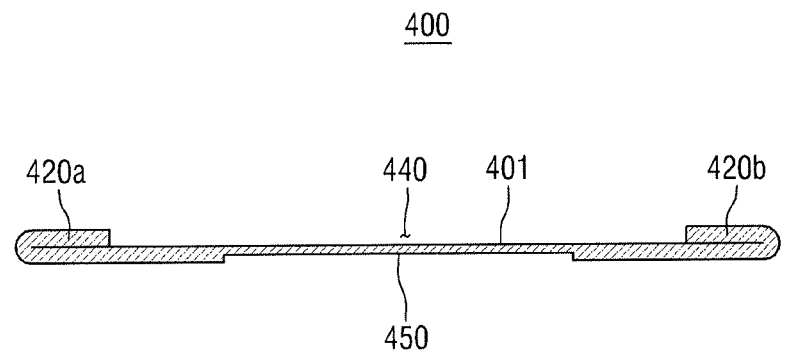
FIG. 17 illustrates a cross-sectional view taken along line E-E' of FIG. 16.

FIG. 14 illustrates a cross-sectional view of a display device according to a fourth exemplary embodiment, taken along line A-A' of FIG. 1, FIG. 15 illustrates an exploded perspective view of the display device according to a fourth exemplary embodiment, FIG. 16 illustrates a perspective view of a mold frame that is applied to the display device according to a fourth exemplary embodiment, and FIG. 17 illustrates a cross-sectional view taken along line E-E' of FIG. 16.

The display device according to a fourth exemplary embodiment may have the same structure as the display device according to a first exemplary embodiment, except for the shape of a mold frame 400, and will hereinafter be described, focusing mainly on differences with the display device according to a first exemplary embodiment.

Referring to FIGS. 14 to 17, the mold frame 400, which may be applied to the display device according to a fourth exemplary embodiment, may be attached to a display module 17 via an adhesive layer 18, which may be attached onto the opposite side of the light-emitting surface of the display module 17. The mold frame 400 may include a bottom portion 401 and a receiving groove 450, which may be formed at the bottom of the bottom portion 401.

The receiving groove 450 may be recessed in a direction that penetrates the thickness of the mold frame 400 to form a space therein, and may be formed by partially cutting out the thickness of the mold frame 400. The receiving groove

450 may allow one end of an FPCB 17*a* to be connected to a first substrate via a TCP while holding the other end of the FPCB 17*a* therein, and may provide space for accommodating electronic elements disposed on the FPCB 17*a*. Accordingly, there may not be a need to form an additional layer of space for accommodating the electronic elements on the FPCB 17*a*, and the thickness of a display device may be reduced while improving the strength of the mold frame 400 with a plurality of bent portions 410*a*, 410*b*, 420*a* and 420*b*.

The mold frame 400, like the mold frame 100 of the display device according to a first exemplary embodiment, may include one of copper and stainless steel, and may be attached on the opposite side of the light-emitting surface of the display module 17.

The mold frame 400 may be formed in the shape of a plate and may be transformed by bending the four sides thereof inwardly toward the bottom portion 401 through hemming to overlap the bottom portion 401.

Referring to FIG. 16, the four bent portions 410*a*, 410*b*, 420*a* and 420*b* may be formed along the four sides, respectively, of the bottom portion 401, and four non-bent portions 430*a*, 430*b*, 430*c* and 430*d* may be defined at the four corners, respectively, of the bottom portion 401. For example, the area of the non-bent portions 430*a*, 430*b*, 430*c* and 430*d* may be set as long as the non-bent portions 430*a*, 430*b*, 430*c* and 430*d* may prevent the bent portions 410*a*, 410*b*, 420*a* and 420*b* from interfering with one another while being folded over to overlap the bottom portion 401.

By way of summation and review, when many parts or elements are coupled to a stainless steel plate of a display device, the flatness of the stainless steel plate may deteriorate, and the stainless steel plate may not be able to properly support a display panel. When numerous parts or elements are coupled to the stainless steel plate, it may be necessary to use complicated processes such as welding and numerical control (NC) cutting, the thickness and weight of a display device may increase, and the yield of a display device may decreases. A plurality of parts or elements may need to be assembled together to form a built-in frame, the assembly of a display device may become complicated, and the manufacturing cost of a display device may increase.

According to exemplary embodiments, it may be possible to reduce the thickness of a display device and at the same time, maintain strength for supporting a display panel and/or improve durability.

According to exemplary embodiments, a display device may include a mold frame with a plurality of bent portions bent from the bottom thereof. Accordingly, the strength of the mold frame may be improved by increasing the thickness of the sidewalls of the mold frame without varying the material of the mold frame. For example, even if the thickness of the mold frame is reduced to improve the thinness and compactness of a display device, distortion or warping of the display device may be prevented, for example, due to the presence of the bent portions of the mold frame.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a mold frame including a bottom plate and a plurality of bent portions, the bent portions being continuous with the bottom plate such that the bent portions extend from and are bent from sides of the bottom plate in a direction toward a first surface of the bottom plate to overlap the bottom plate;
   a display module on a first side of the mold frame; and
   a bracket on a second side of the mold frame and coupled to the mold frame,
   the mold frame further including a receiving space, the receiving space being defined by the first surface of the bottom plate and the bent portions for accommodating parts therein.

2. The display device as claimed in claim 1, further comprising a battery in the receiving space.

3. The display device as claimed in claim 2, wherein the battery is between, and in contact with, the mold frame and the bracket.

4. The display device as claimed in claim 2, wherein:
   the bottom plate includes a reinforcing protrusion, the reinforcing protrusion protruding into the receiving space, and
   the battery is on the reinforcing protrusion.

5. The display device as claimed in claim 4, wherein the bottom plate further includes a reinforcing groove, the reinforcing groove being on a side of the bottom plate opposite the reinforcing protrusion and having a depth corresponding to a height of the reinforcing protrusion.

6. The display device as claimed in claim 1, wherein:
   the bottom plate has a rectangular shape with four sides, and
   each of the bent portions is bent from one of the four sides of the bottom plate.

7. The display device as claimed in claim 6, wherein the mold frame further includes a plurality of non-bent portions, each of the non-bent portions being at a corner of the bottom plate and not overlapping the bent portions.

8. The display device as claimed in claim 1, wherein each of the bent portions is bent at least twice by hemming.

9. The display device as claimed in claim 1, wherein the mold frame includes one or more of copper or stainless steel.

10. The display device as claimed in claim 1, wherein the bottom plate includes a receiving groove, the receiving groove being on a side of the bottom plate opposite the receiving space.

11. The display device as claimed in claim 10, further comprising a heat dissipation layer in the receiving groove.

12. The display device as claimed in claim 11, further comprising a cushion layer covering the heat dissipation layer to shield the heat dissipation layer from an outside of the display device, the cushion layer being attached to the mold frame.

13. The display device as claimed in claim 11, wherein the heat dissipation layer includes a graphite material.

14. A display device, comprising:
   a mold frame including a bottom plate and a plurality of bent portions, the bent portions being continuous with the bottom plate such that the bent portions extend from and are bent from sides of the bottom plate in a direction toward a first surface of the bottom plate to overlap the bottom plate;
   a display module on a first side of the mold frame;

a cushion layer between the mold frame and the display module;

a battery; and a bracket on a second side of the mold frame and coupled to the mold frame, the mold frame further including a receiving space, the receiving space being defined by the first surface of the bottom plate and the bent portions for accommodating parts therein, the battery being in the receiving space.

15. The display device as claimed in claim 14, further comprising a heat dissipation layer between the mold frame and the cushion layer.

16. The display device as claimed in claim 14, wherein:

the bottom plate has a rectangular shape with four sides, and each of the bent portions is bent from one of the four sides of the bottom plate.

17. The display device as claimed in claim 14, wherein the mold frame further includes a plurality of non-bent portions, each of the non-bent portions being at a corner of the bottom plate and not overlapping the bent portions.

18. The display device as claimed in claim 14, wherein the bottom plate includes a receiving groove, the receiving groove being on a side of the bottom plate opposite the receiving space.

19. The display device as claimed in claim 14, wherein:

the bottom plate includes a reinforcing protrusion, the reinforcing protrusion protruding into the receiving space, and the battery is on the reinforcing protrusion.

20. The display device as claimed in claim 19, wherein the bottom plate further includes a reinforcing groove, the reinforcing groove being on a side of the bottom plate opposite the reinforcing protrusion and having a depth corresponding to a height of the reinforcing protrusion.

* * * * *